United States Patent Office 3,513,006
Patented May 19, 1970

---

3,513,006
PROCESS FOR THE PREPARATION OF A MIXED PIGMENT
Walter Breckheimer, Bensberg, and Wilhelm Kunz, Cologne-Mulheim, Germany, assignors to Firma Oskar Neynaber & Co., A.G., Lorstedt, near Bremerhaven, Germany
No Drawing. Filed Apr. 3, 1967, Ser. No. 627,675
Claims priority, application Germany, Apr. 6, 1966, N 28,354
Int. Cl. C09c 1/14
U.S. Cl. 106—297    13 Claims

ABSTRACT OF THE DISCLOSURE

A mixed lead carbonate-lead sulfate pigment is prepared by adding sulfuric acid and carbon monoxide in amounts less than those stoichiometrically required to a slurry of lead monoxide in water, separating a coprecipitate of lead carbonate and sulfate, washing and drying the coprecipitate and then subjecting it to a thermal treatment at a temperature in the range of 150° to 300° C., preferably 200° to 230° C., and preferably in the presence of a decomposition catalyst such as a lead salt of acetic or propionic acid.

---

This invention relates to a mixed pigment based on basic lead carbonate and basic lead sulfate and a process of preparing said mixed pigment.

The preparation of inorganic, basic lead compounds is known. Such a production process is described, for example, in U.S. Pat. 2,249,330. In this process, the basic lead compounds are obtained by adding a specific amount of the acid the lead compound of which is desired to a stirred slurry of lead monoxide in water while simultaneously adding reaction promotors such as nitric acid or acetic acid. The resultant suspension of the compound is washed, filtered, dried and ground. It is also possible in this manner to prepare lead coprecipitates by adding different acids successively to the lead monoxide slurry (German published patent application 1,068,237).

It is known that inorganic lead compounds have found wide use as pigments.

It has now been found that active pigments are obtained by subjecting the coprecipitates to a thermal treatment after drying and grinding. It is accordingly an object of this invention to provide a process for the preparation of a mixed pigment based on basic lead carbonate and basic lead sulfate, the process comprising adding sulfuric acid and carbon dioxide in amounts less than those stoichiometrically required to a slurry of lead monoxide in water, separating the coprecipitate of basic lead carbonate/lead sulfate, washing and drying the coprecipitate and thereafter subjecting it to thermal treatment.

It is unessential whether the sulfuric acid or the carbon dioxide is first added. Carbon dioxide is conveniently added by introducing $CO_2$ into the slurry. Depending upon the order of adding the acids, basic lead sulfate or basic lead carbonate is precipitated first. It is essential that an excess of lead oxide over the acid added is always present.

If particularly active pigments are desired, it is necessary to operate under specific precipitating conditions. When precipitating the carbonate portion, it is to be considered that a larger amount of carbon dioxide is taken up by the lead monoxide slurry only at temperatures of below about 50 C. When precipitating the carbonate first, room temperature is advantageously used. The amount of carbon dioxide absorbed may vary within relatively wide limits but is chosen such that preferably not more than about 8% by weight of carbon dioxide, calculated from the loss on ignition of a dry sample which has not been subjected to thermal treatment, are combined.

When adding sulfuric acid, white lead compounds which, according to analysis, correspond to a sulfate higher than tetrabasic are obtained at temperatures in excess of 95° C. Therefore, in a preferred embodiment of the invention, temperatures in excess of 95° C. are used when adding sulfuric acid.

The products obtained by the process of the invention have more favorable pigment properties than the mixtures of separately prepared products. Thus, they have superior brightening and covering power and the coatings obtained with this mixed pigment have higher film hardness and higher gloss.

A further definite improvement of these properties is obtained by the thermal aftertreatment of the coprecipitate of basic lead sulfate/lead carbonate. In this treatment, the water of constitution and a minor part of carbon dioxide are split off.

To obtain the best activity, the thermal treatment is only carried out until the degree of dehydration desired has just been reached and no sintering or growth of crystal of the product occurs by the action of temperature.

The treating temperatures range between 150 and 300° C. Above 300° C., discolored and less active lead oxide-containing products are obtained and below 150° C. the decomposition proceeds at an excessively slow rate. Temperatures of from 200 to 230° C. have been found to be particularly advantageous, the time of thermal treatment being generally about 2 to 4 hours.

It is essential for the thermal treatment step that small amounts of a decomposition catalyst accelerating the decomposition are present. In the absence of such materials, the decomposition takes an excessively long time so that the product will sinter and the activity will be reduced. For example, lower carboxylic acids, especially acetic and propionic acids, and salts thereof, preferably the corresponding lead salts, have been found to be suitable decomposition catalysts. It is the only requirement for the addition of these decomposition catalysts that it is effected before the thermal treatment of the product. The catalysts may either be formed directly in the lead monoxide slurry by adding a small amount of acetic or propionic acid or these acids may be admixed to the filter cake or the already dried product. The amount of the decomposition catalyst is not critical, but amounts of about 0.1 to 1% by weight, based on the total weight of dry substance, are preferably used.

The addition of acid and consequently the precipitation is desirably discontinued when the color of the product changes from the yellowish color of the lead monoxide slurry to white. This "white point" can be readily preceived visually. Interruption of the reaction at this point gives a particularly finely divided active product. Preferably the sulfuric acid is used in an amount sufficient that from 50 to 90% by weight and especially from 60 to 80% by weight of basic lead sulfate are present in the final product.

The following examples are given by way of illustration and not limitation.

EXAMPLE 1

1.6 milliliters of 80% acetic acid are added to a slurry of 200 g. of lead monoxide in 840 ml. of water while stirring. Then a mixture of 44 ml. of 20% sulfuric acid and 220 ml. of water is slowly added at room temperature. Carbon dioxide is then introduced into the suspension which is still slightly yellow due to residual lead monoxide until the precipitation product is almost white. The suspension is filtered and washed. The sludge filtered off is mixed with 6 ml. of a 10% lead acetate solution. The filter cake is dried at 110° C. in a drying cabinet and comminuted after drying. The product is then heated for 3 hours to 230° C. in a laboratory furnace. About 2.6% of water and carbon dioxide are split off under these conditions. The stoichiometrically calculated portion of basic lead carbonate is 40%, that of basic lead sulfate 60%.

EXAMPLE 2

After addition of 2 ml. of 80% acetic acid, carbon dioxide is introduced into a slurry of 200 g. of lead monoxide in 840 ml. of water until the loss on ignition of a dried sample is 4.4%. The suspension is then heated to about 97° C. and mixed with 5% sulfuric acid until the suspension has just turned white. The product is filtered, washed, dried at 120° C. and ground. Thereafter, 10 ml. of a 5% propionic acid are added. The mixture is then heated for 3 hours to 230° C. This results in a loss in weight of about 1.4%. The analysis shows a loss on ignition (carbon dioxide) of 2.95%, a $SO_3$ content of 4.1% and a PbO content of 92.95%.

What is claimed is:

1. Process for the preparation of a mixed pigment based on basic lead carbonate and basic lead sulfate, which comprises adding sulfuric acid and carbon dioxide in amounts less than those stoichiometrically required to a slurry of lead monoxide in water, separating a coprecipitate of basic lead carbonate-lead sulfate, washing and drying the coprecipitate and thereafter subjecting it to thermal treatment at a temperature in the range of 150° to 300° C.

2. Process according to claim 1 wherein said carbon dioxide is added at temperatures of not more than 50° C.

3. Process according to claim 1, wherein carbon dioxide in an amount sufficient to give a carbon dioxide content of about 8 percent by weight in the reaction product is introduced.

4. Process according to claim 1, wherein said sulfuric acid is added at temperatures in excess of 95° C.

5. Process according to claim 1, wherein said sulfuric acid is added in an amount sufficient to give from 50 to 90% by weight of basic lead sulfate in the finished product.

6. Process according to claim 1 wherein said thermal treatment is carried out at a temperature of from 200 to 230° C. and wherein said sulfuric acid is added in an amount sufficient to give from 60 to 80 percent by weight of basic lead sulfate in the finished product.

7. A process for the preparation of a mixed pigment based on a basic lead carbonate and a basic lead sulfate, comprising adding sulfuric acid and carbon dioxide in amounts less than those stoichiometrically required to a slurry of lead monoxide in water, separating a coprecipitate of basic lead carbonate-lead sulfate, washing and drying the coprecipitate and thereafter subjecting it to a thermal treatment at a temperature in the range of 150 to 300°C. in the presence of a decomposition catalyst.

8. Process according to claim 7 wherein said decomposition catalyst is a lower carboxylic acid.

9. Process according to claim 7 wherein said decomposition catalyst is used in amounts of from 0.1 to 1% by weight, based on the weight of dry substance.

10. Process according to claim 7 wherein said decomposition catalyst is formed in the slurry of lead monoxide in water by adding a small amount of the appropriate acid.

11. The process of claim 10 wherein said acid is selected from the group consisting of acetic acid and propionic acid.

12. Mixed pigment containing from 50 to 90% by weight of basic lead sulfate in addition to basic lead carbonate.

13. The mixed pigment of claim 12 consisting essentially of 60 to 80 percent by weight of said lead sulfate, and the balance being said lead carbonate.

References Cited

UNITED STATES PATENTS 2,134,528  10/1938  Mitchell _____ 106—297

FOREIGN PATENTS 17,145  1894  Great Britain.

JAMES E. POER, Primary Examiner